(12) United States Patent
Heo et al.

(10) Patent No.: US 12,420,843 B2
(45) Date of Patent: Sep. 23, 2025

(54) AUTONOMOUS DRIVING CONTROL SYSTEM AND COLLISION AVOIDANCE CONTROL METHOD THEREWITH

(71) Applicants: Hyundai Motor Company, Seoul (KR); Kia Corporation, Seoul (KR); Kookmin University Industry Academy Cooperation Foundation, Seoul (KR)

(72) Inventors: Se Jong Heo, Anyang-si (KR); Yeon Sik Kang, Seoul (KR); Kyung Jae Ahn, Seongnam-si (KR); Du Hyeon Cho, Seongnam-si (KR)

(73) Assignees: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 366 days.

(21) Appl. No.: 17/987,286

(22) Filed: Nov. 15, 2022

(65) Prior Publication Data
US 2024/0157976 A1 May 16, 2024

(30) Foreign Application Priority Data
Feb. 3, 2022 (KR) .......................... 10-2022-0014294

(51) Int. Cl.
*B60W 60/00* (2020.01)
*B60W 40/105* (2012.01)

(52) U.S. Cl.
CPC ...... *B60W 60/0027* (2020.02); *B60W 40/105* (2013.01); *B60W 2554/4041* (2020.02); *B60W 2554/4042* (2020.02)

(58) Field of Classification Search
CPC ..... B60W 2420/403; B60W 2420/408; B60W 2520/00; B60W 2520/10;
(Continued)

(56) References Cited

U.S. PATENT DOCUMENTS

2019/0049239 A1* 2/2019 Natroshvili ............ G01N 15/10
2019/0126922 A1* 5/2019 Natroshvili .......... G06V 10/764
(Continued)

FOREIGN PATENT DOCUMENTS

| JP | 2011253302 A | 12/2011 |
| JP | 2020123155 A | 8/2020 |
| KR | 102184929 B1 | 12/2020 |

OTHER PUBLICATIONS

Diehl, C., et al., "Radar-based Dynamic Occupancy Grid Mapping and Object Detection," 23rd IEEE International Conference on Intelligent Transportation Systems, Sep. 20-23, 2020, 6 pages.
(Continued)

*Primary Examiner* — Aniss Chad
*Assistant Examiner* — Christine Nguyen Huynh
(74) *Attorney, Agent, or Firm* — SLATER MATSIL, LLP

(57) ABSTRACT

An embodiment collision avoidance control method with an autonomous driving control system includes generating a grid map by storing vehicle information including position and velocity vectors of a vehicle and object information including position and velocity vectors of an object sensed around the vehicle in a grid cell corresponding to an area occupied by the vehicle and the object and determining, as a collision risk area, an area where a grid cell occupied by the vehicle for each reference time set based on the vehicle information overlaps a grid cell occupied by the object for each reference time predicted based on the object information, to control avoidance of the collision risk area.

9 Claims, 11 Drawing Sheets

(58) Field of Classification Search
CPC ... B60W 2554/404; B60W 2554/4041; B60W 2554/4042; B60W 30/08; B60W 30/0953; B60W 30/0956; B60W 40/02; B60W 40/105; B60W 60/0016; B60W 60/0027
See application file for complete search history.

(56) References Cited

U.S. PATENT DOCUMENTS

| | | |
|---|---|---|
| 2020/0156663 A1 | 5/2020 | Alvarez et al. |
| 2020/0239020 A1 | 7/2020 | Aoki |
| 2021/0213978 A1 | 7/2021 | Edling et al. |
| 2022/0092983 A1* | 3/2022 | Hong .................. G05D 1/0278 |

OTHER PUBLICATIONS

Kim, Dae Jung, et al., "Object Vehicle Motion Prediction Based on Dynamic Occupancy Grid Map Utilizing Cascaded Support Vector Machine," 2019 19th International Conference on Control, Automation and Systems (ICCAS 2019), Oct. 15-18, 2019, 5 pages.

Schreiber, M., et al., "Dynamic Occupancy Grid Mapping with Recurrent Neural Networks," 2021 IEEE International Conference on Robotics and Automation, May 30-Jun. 5, 2021, 8 pages.

* cited by examiner

AUTONOMOUS DRIVING CONTROL SYSTEM AND COLLISION AVOIDANCE CONTROL METHOD THEREWITH

CROSS-REFERENCE TO RELATED APPLICATIONS

This application claims the benefit of Korean Patent Application No. 10-2022-0014294, filed on Feb. 3, 2022, which application is hereby incorporated herein by reference.

TECHNICAL FIELD

Embodiments relate to an autonomous driving control system and a collision avoidance control method therewith.

BACKGROUND

An autonomous vehicle refers to a vehicle that is capable of traveling to a destination by grasping road and surrounding conditions by itself without the need for a driver to operate an accelerator pedal, a steering wheel, a brake or the like.

The autonomous vehicle measures a driving environment and controls a travel path based on the measured driving environment. When planning a path, it is necessary to determine an area where there are no obstacles and then to establish a safe path to avoid collisions with obstacles.

Accordingly, research continues to generate a safe travel path by predicting a collision risk area while a vehicle is traveling.

SUMMARY

Accordingly, embodiments are directed to an autonomous driving control system and a collision avoidance control method therewith that substantially obviate one or more problems due to limitations and disadvantages of the related art.

Embodiments provide an autonomous driving control system and a collision avoidance control method therewith, which are capable of performing collision avoidance by accurately predicting a movement area of dynamic objects around a vehicle.

Embodiments are not limited to the above-mentioned features, and other features of embodiments of the present invention can be clearly understood by those skilled in the art to which the present invention pertains from the following description.

Additional advantages, objects, and features of the embodiments will be set forth in part in the description which follows and in part will become apparent to those having ordinary skill in the art upon examination of the following or may be learned from practice of the invention. The features and other advantages of embodiments of the invention may be realized and attained by the structure particularly pointed out in the written description and claims hereof as well as the appended drawings.

In accordance with embodiments of the invention, there is provided a collision avoidance control method with autonomous driving control systems that includes generating a grid map by storing vehicle information including position and velocity vectors of a vehicle and object information including position and velocity vectors of an object sensed around the vehicle in a grid cell corresponding to an area occupied by the vehicle and the object, and determining, as a collision risk area, an area where a grid cell occupied by the vehicle for each reference time set based on the vehicle information overlaps a grid cell occupied by the object for each reference time predicted based on the object information, to control the collision risk area to be avoided.

The generating a grid map may include acquiring sensing information including at least one of position information and velocity information of the object by a plurality of sensors, storing the sensing information acquired from each of the plurality of sensors in that grid cell, estimating a position, a velocity, and an occupancy probability of each grid cell based on the vehicle information and the sensing information, and storing the estimated position, velocity, and occupancy probability of the object as the object information in the grid cell.

In the prediction area, as time increases, a range of a movement prediction area of the object may increase and a prediction probability allocated to each grid cell may decrease.

The estimating a position, a velocity, and an occupancy probability of each grid cell based on the vehicle information and the sensing information may include calculating a representative velocity vector of each grid cell based on the sensing information stored in the grid cell, calculating a predicted standard deviation for each time by substituting the representative velocity vector and the sensing information into a preset equation, and estimating the occupancy probability of the grid cell using the predicted standard deviation. In the calculating a representative velocity vector of each grid cell based on the sensing information stored in the grid cell, when a velocity of the sensing information stored in the grid cell is expressed as $\{v_x^i, v_y^i\}$ using X-Y coordinates of the grid cell, a representative velocity $\{v_x, v_y\}$ of that grid cell may be calculated by the following Equation 1:

$$v_x = \frac{1}{n}\sum_{i=1}^{n} v_x^i, \quad v_y = \frac{1}{n}\sum_{i=1}^{n} v_y^i \qquad \text{Equation 1}$$

where n is the number of types of sensing information present in that grid cell.

The calculating a predicted standard deviation for each time by substituting the representative velocity vector and the sensing information into a preset equation may include converting the velocity $\{v_x^i, v_y^i\}$ of the sensing information expressed as the X-Y coordinates of the grid cell into a coordinate system X'-Y' of the representative velocity and calculating the predicted standard deviation for each time by substituting the sensing information of which the coordinate system is converted into the following Equation 2.

Equation 2

$$\sigma_{p,v_{x'}}(t) = \frac{\sigma_{v_{x'}}}{1 + \alpha(t-k)} \qquad (1)$$

$$\sigma_{p,v_{y'}}(t) = \frac{\sigma_{v_{y'}}}{1 + \alpha(t-k)} \qquad (2)$$

$\alpha$: STANDARD DEVIATION DAMPING RATIO $\sigma_{v_{x'}}$: $v_{x'}$ STANDARD DEVIATION $\sigma_{v_{y'}}$: $v_{y'}$ STANDARD DEVIATION -continued $\sigma_{p,v_{x'}}$:PREDICTED $v_{x'}$ STANDARD DEVIATION AT $K$ $\sigma_{p,v_{y'}}$:PREDICTED $v_{y'}$ STANDARD DEVIATION AT $K$ The estimating the occupancy probability of the grid cell using the predicted standard deviation may include generating a prediction area of a Gaussian distribution using the predicted standard deviation for each time.

In another embodiment of the present invention, there is provided a non-transitory computer-readable storage medium recording a program for executing a collision avoidance control method with autonomous driving control systems, the program being configured to implement a function of generating a grid map by storing vehicle information including position and velocity vectors of a vehicle and object information including position and velocity vectors of an object sensed around the vehicle in a grid cell corresponding to an area occupied by the vehicle and the object, and a function of determining, as a collision risk area, an area where a grid cell occupied by the vehicle for each reference time set based on the vehicle information overlaps a grid cell occupied by the object for each reference time predicted based on the object information, to control the collision risk area to be avoided.

In a further embodiment of the present invention, there is provided an autonomous driving control system that includes a map creation unit configured to generate a grid map by storing vehicle information including position and velocity vectors of a vehicle and object information including position and velocity vectors of an object sensed around the vehicle in a grid cell corresponding to an area occupied by the vehicle and the object, a risk area detection unit configured to determine, as a collision risk area, an area where a grid cell occupied by the vehicle for each reference time set based on the vehicle information overlaps a grid cell occupied by the object for each reference time predicted based on the object information, and a driving control unit configured to control the collision risk area to be avoided.

The map creation unit may acquire sensing information including at least one of position information and velocity information of the object by a plurality of sensors, store the sensing information acquired from each of the plurality of sensors in that grid cell, estimate a position, a velocity, and an occupancy probability of each grid cell based on the vehicle information and the sensing information, and store the estimated position, velocity, and occupancy probability of the object as the object information in the grid cell.

In the prediction area, as time increases, a range of a movement prediction area of the object may increase and a prediction probability allocated to each grid cell may decrease.

The map creation unit may calculate a representative velocity vector of each grid cell based on the sensing information stored in the grid cell, calculate a predicted standard deviation for each time by substituting the representative velocity vector and the sensing information into a preset equation, and estimate the occupancy probability of the grid cell using the predicted standard deviation.

The map creation unit may be configured such that, when a velocity of the sensing information stored in the grid cell is expressed as $\{v_x^i, v_y^i\}$ using X-Y coordinates of the grid cell, a representative velocity $\{v_x, v_y\}$ of that grid cell is calculated by the following Equation 1:

$$v_x = \frac{1}{n}\sum_{i=1}^n v_x^i, \quad v_y = \frac{1}{n}\sum_{i=1}^n v_y^i \qquad \text{Equation 1}$$

where n is the number of types of sensing information present in that grid cell.

The autonomous driving control system may further include an object path prediction unit configured to convert the velocity $\{v_x^i, v_y^i\}$ of the sensing information expressed as the X-Y coordinates of the grid cell into a coordinate system X'-Y' of the representative velocity and to calculate the predicted standard deviation for each time by substituting the sensing information of which the coordinate system is converted into the following Equation 2.

Equation 2

$$\sigma_{p,v_{x'}}(t) = \frac{\sigma_{v_{x'}}}{1+\alpha(t-k)} \qquad (1)$$

$$\sigma_{p,v_{y'}}(t) = \frac{\sigma_{v_{y'}}}{1+\alpha(t-k)} \qquad (2)$$

$\alpha$:STANDARD DEVIATION DAMPING RATIO $\sigma_{v_{x'}}$:$v_{x'}$ STANDARD DEVIATION $\sigma_{v_{y'}}$:$v_{y'}$ STANDARD DEVIATION $\sigma_{p,v_{x'}}$:PREDICTED $v_{x'}$ STANDARD DEVIATION AT $K$ $\sigma_{p,v_{y'}}$:PREDICTED $v_{y'}$ STANDARD DEVIATION AT $K$ The object path prediction unit may generate a prediction area of a Gaussian distribution using the predicted standard deviation for each time.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

Figure 1:
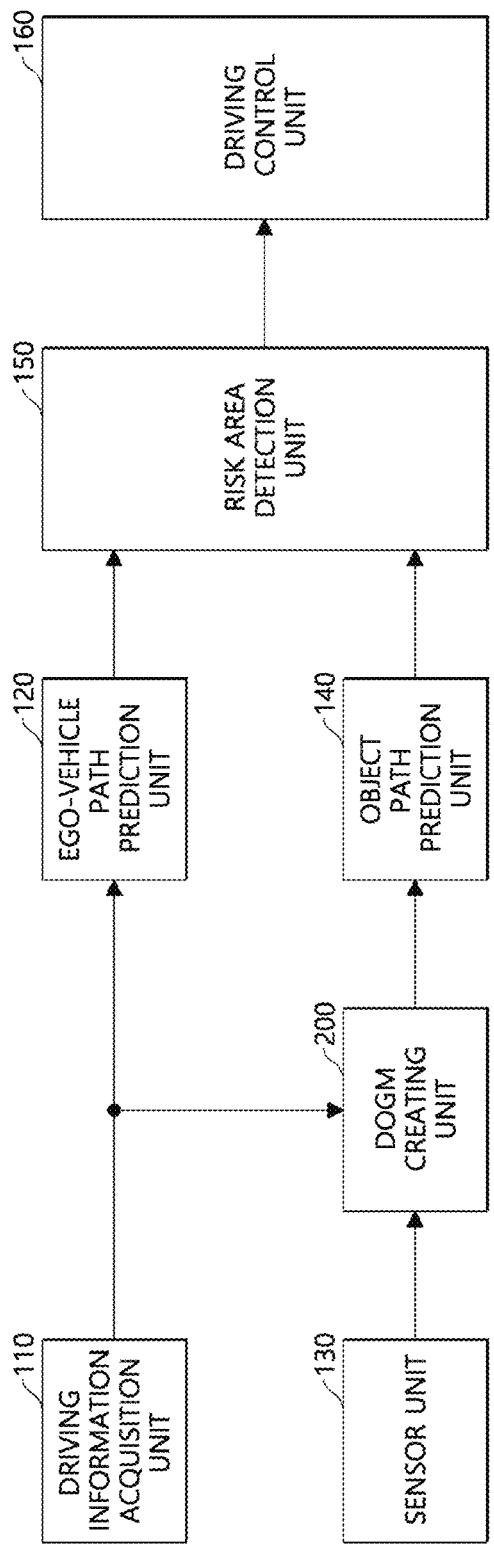
FIG. 1 is a block diagram schematically illustrating an autonomous driving control system according to an embodiment.

Reference will now be made in detail to the preferred embodiments of the present invention, examples of which are illustrated in the accompanying drawings. However, the present invention may be embodied in different forms and should not be construed as being limited to the embodiments set forth herein. Rather, these embodiments are provided so that this disclosure will be thorough and complete, and will fully convey the scope of the present invention to those skilled in the art.

In the following description, it will be understood that, when an element is referred to as being formed "on" or "under" another element, it may be directly "on" or "under" the other element or be indirectly formed with one or more intervening elements therebetween.

In addition, it will be understood that "on" or "under" the element may mean an upward direction and a downward direction of the element.

Relational terms such as "first" and "second" and "on"/ "up"/"above" and "under"/"down"/"beneath" herein may also be used to distinguish one entity or element from another without necessarily requiring or implying any physical or logical relationship or order between such entities or elements.

Throughout the specification, it will be understood that when a component is referred to as "comprising"/"including" any component, it does not exclude other components, but can further comprise/include the other components unless specified otherwise. In order to clearly illustrate embodiments of the present invention in the drawings, parts irrelevant to the description may be omitted in the drawings, and like reference numerals refer to like elements throughout the specification.

According to an embodiment of the present invention, by estimating movement of surrounding objects using a dynamic occupancy grid map that stores positions, velocities, and occupancy probabilities of objects around a vehicle, it is possible to predict movement paths of the objects around the vehicle regardless of the type of objects such as vehicles or pedestrians. It is possible to detect a collision risk area by comparing an area occupied by moving objects for each time with an ego-vehicle driving area and to generate a travel path to avoid collision.

Hereinafter, an autonomous driving control system and a collision avoidance control method therewith according to an embodiment of the present invention will be described with reference to the drawings.

FIG. 1 is a block diagram schematically illustrating an autonomous driving control system according to an embodiment.

Referring to FIG. 1, the autonomous driving control system according to the embodiment includes a sensor unit 130, a driving information acquisition unit 110, an ego-vehicle path prediction unit 120, a dynamic occupancy grid map (hereinafter referred to as "DOGM") creation unit 200, an object path prediction unit 140, a risk area detection unit 150, and a driving control unit 160.

The sensor unit 130 detects a position, a velocity, an acceleration, etc. of an object around an ego-vehicle and pre-processes the same to generate an occupancy grid map (hereinafter referred to as an "OGM"). The sensor unit 100 may include various sensors, such as LiDAR, a camera, and radar, and may generate the OGM by integrating sensing data input from each sensor into one grid map.

The driving information acquisition unit no acquires ego-vehicle information including position information, velocity information, and travel path information of the ego-vehicle.

The ego-vehicle path prediction unit 120 uses the ego-vehicle information to generate a driving area for each time on the grid map.

The DOGM creation unit 200 may receive the OGM and ego-vehicle information generated by the sensor unit 130 and generate a DOGM including an occupancy probability, an occupancy position, a representative velocity vector, and the like of an object for each grid cell. The DOGM creation unit 200 may include a grid map updater, a particle filter, and a grid information estimator. The grid map updater receives the OGM and ego-vehicle information generated by the sensor unit 130 and updates the grid map information. The particle filter filters particle data included in each grid cell. The particle data refers to sensing data in the grid cell. A plurality of types of particle data each having a position, a velocity, a direction, etc. may exist in the grid cell. The particle filter may filter meaningful data of these types of particle data. The grid information estimator may estimate a position, a velocity, and an occupancy probability representing that grid cell based on the filtered particle data. Accordingly, the position, velocity, and occupancy probability of an object for each grid cell may be stored in the finally generated DOGM.

Figure 2:
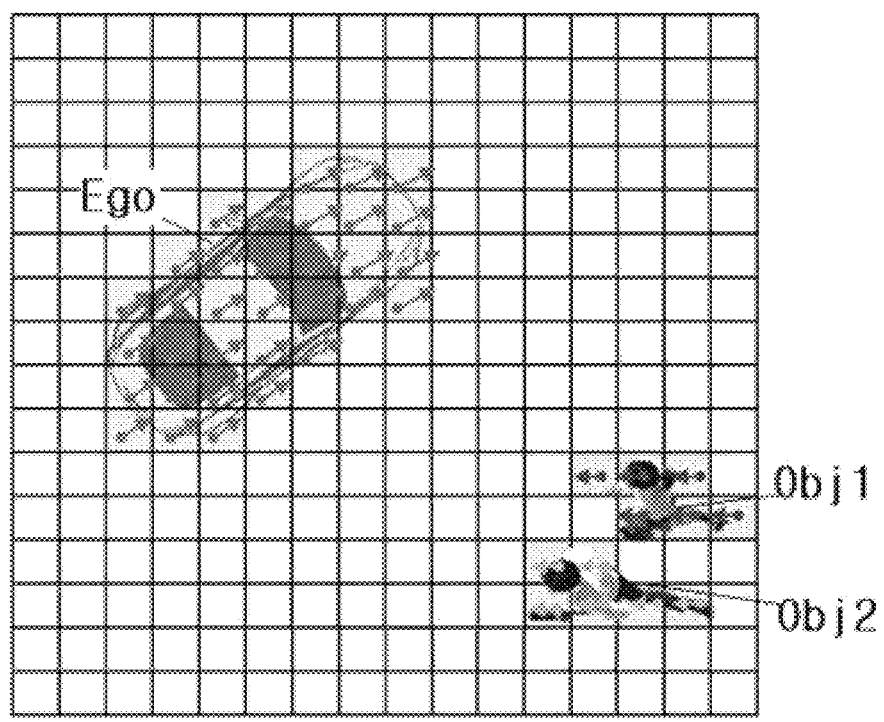
FIG. 2 is a diagram for explaining a concept of a DOGM in FIG. 1.

FIG. 2 is a diagram for explaining a concept of a DOGM. As illustrated in FIG. 2, in the DOGM, position information of objects is stored in grid cells occupied by an ego-vehicle Ego and objects Obj1 and Obj2, and information such as a velocity, a direction, and an occupancy probability in each cell is stored therein. Since a velocity and a direction, i.e., a velocity vector, is calculated for each grid cell, the direction and velocity of movement of an object may be predicted through the velocity vector for each grid cell regardless of the type of objects.

The object path prediction unit 140 determines, based on the DOGM, a grid cell considered to be occupied by a dynamic object on the grid map. The object path prediction unit 140 predicts a representative velocity and a path by using the representative velocity vector of the grid cell occupied by the dynamic object and the standard deviation of particle data included in the grid cell. The object path prediction unit 140 predicts a movement area of an object for each time based on the result of prediction.

The risk area detection unit 150 compares a driving prediction area of the ego-vehicle with a movement prediction area of the surrounding object at the same time and sets the overlapping grid cell as a collision risk area. The risk area detection unit 150 generates collision information including a collision prediction time, a collision risk grid cell position, and a collision probability.

The driving control unit 160 may control a driving state by determining the travel path of the ego-vehicle based on the collision information output from the risk area detection unit 150.

Figure 3:
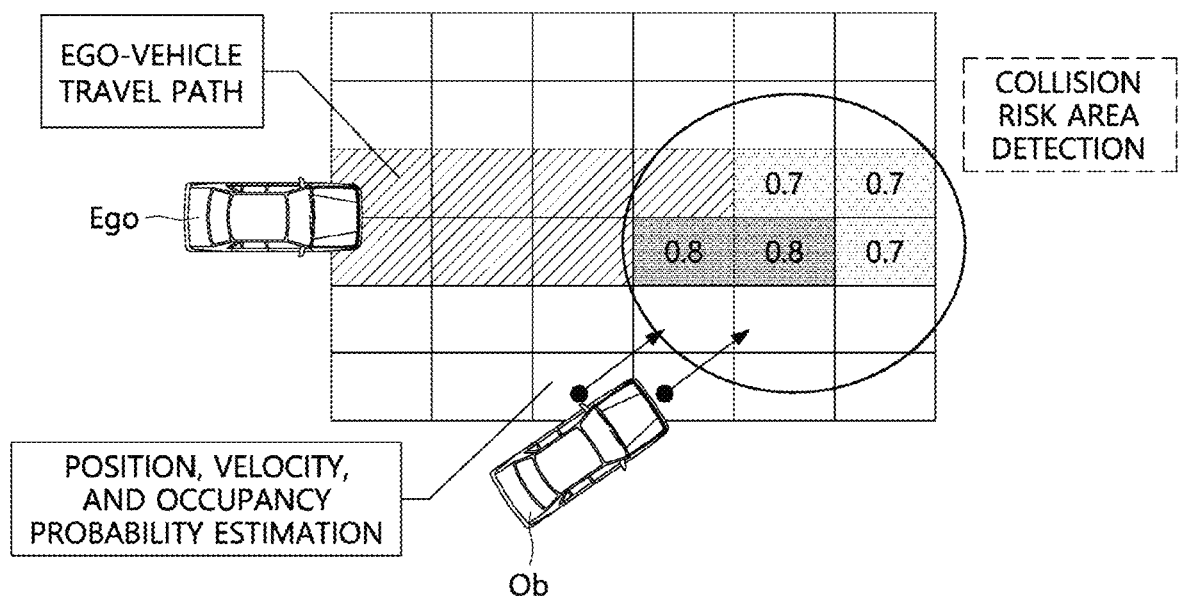
FIG. 3 is a diagram for explaining a concept of a collision avoidance control method according to an embodiment.

FIG. 3 is a diagram for explaining a concept of a collision avoidance control method according to an embodiment.

The DOGM stores information such as a velocity and a position of an ego-vehicle Ego, which allows the travel path of the ego-vehicle Ego for each time to be predicted. In addition, in the DOGM, position information of an object Ob is stored in a grid cell, and information such as a velocity, a direction, and an occupancy probability in that cell is stored. Since a velocity and a direction, i.e., a velocity vector, is calculated for each grid cell, the direction and velocity of movement of the object Ob may be predicted therethrough.

When the travel path of the ego-vehicle Ego is compared with the movement prediction area of the object Ob, an area where the two areas overlap at the same time may be determined as a collision risk area. When the collision risk area is identified, the collision information including the collision prediction time, the collision risk grid cell position, and the collision probability may be generated.

Accordingly, the autonomous driving control system may control the driving state of the ego-vehicle, such as changing its path or decelerating or accelerating, in order to avoid a collision in the collision risk area.

Figure 4:
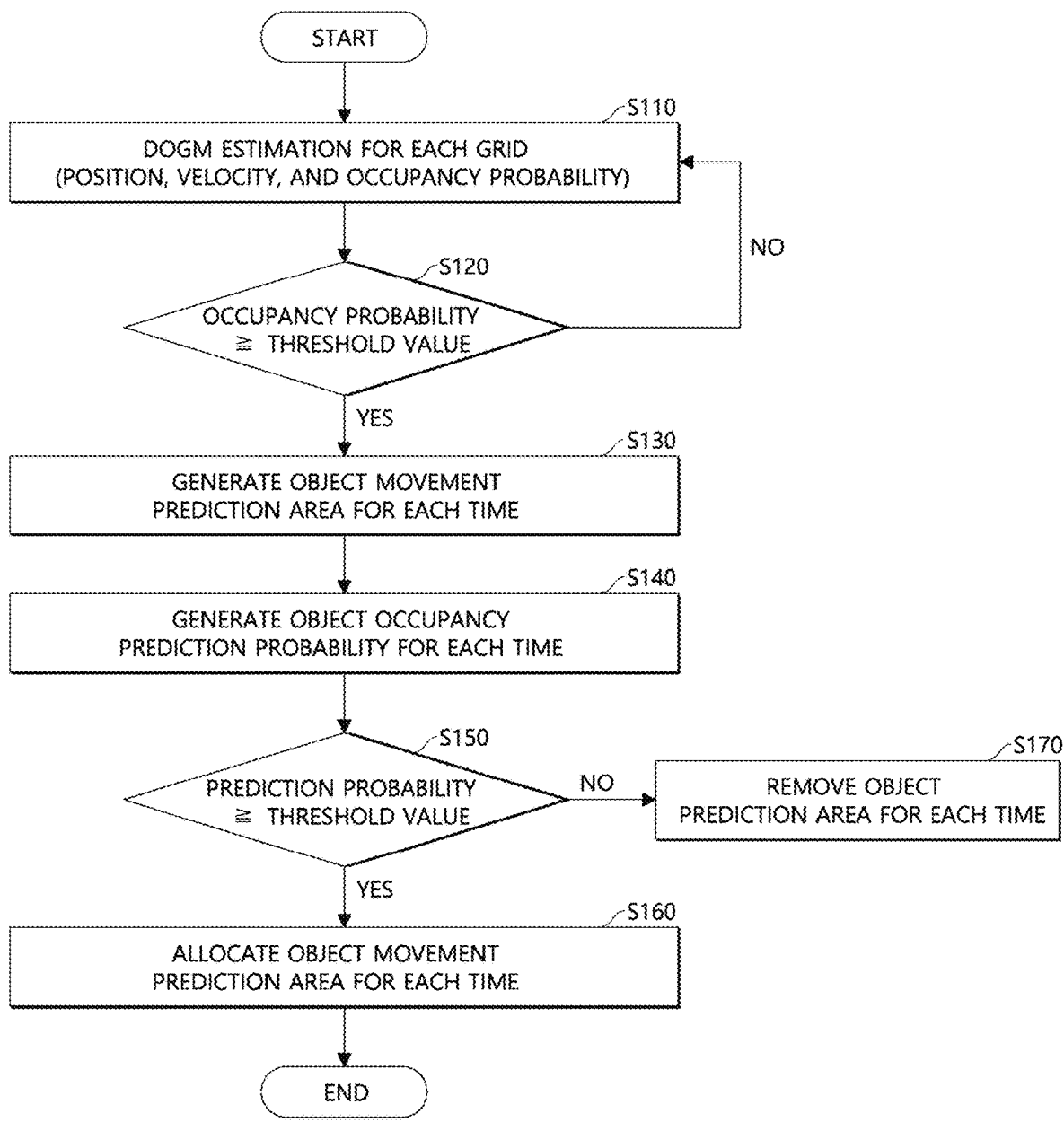
FIG. 4 is a flowchart illustrating a surrounding object movement prediction method with the collision avoidance control method according to an embodiment.
Figure 5:
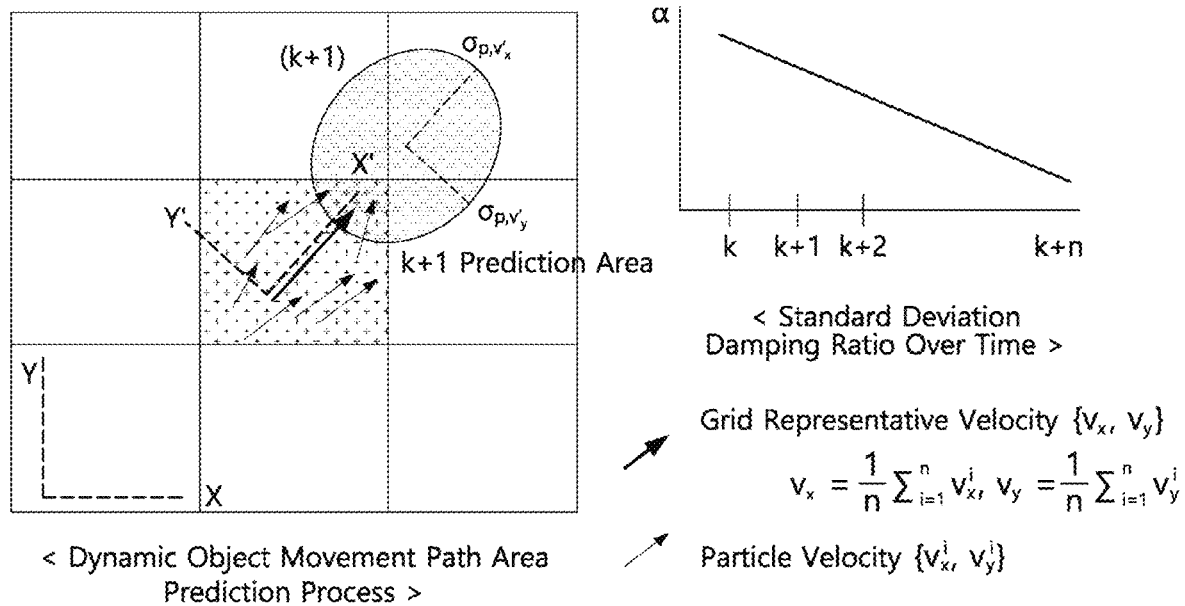
FIGS. 5 to 7 are diagrams for explaining the surrounding object movement prediction method according to an embodiment.
Figure 6:
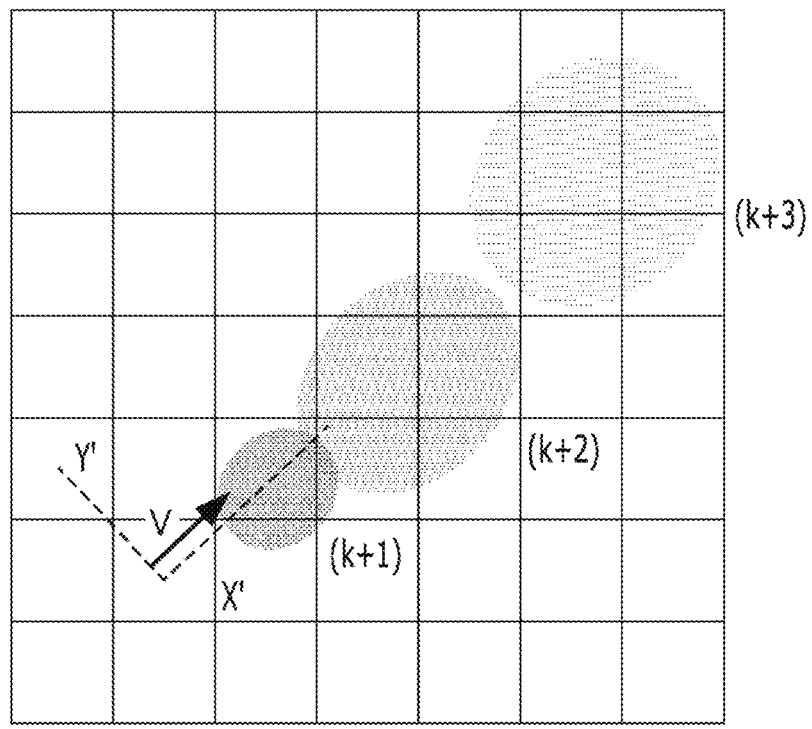
Figure 7:
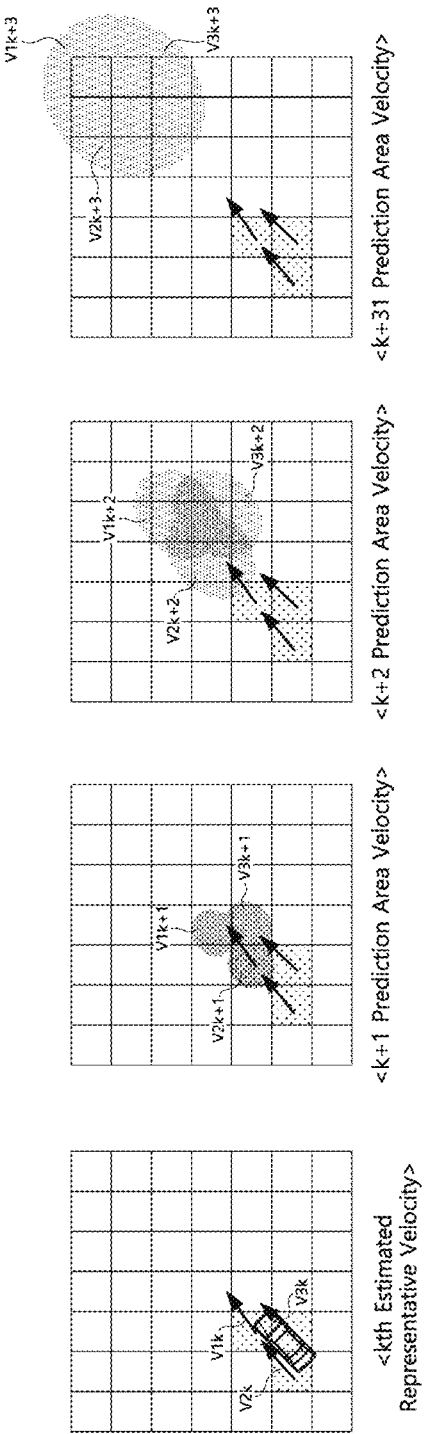

A method of predicting a movement path of a surrounding object using the DOGM according to an embodiment will be described in detail with reference to FIGS. 4 to 7. FIG. 4 is a flowchart illustrating a surrounding object movement prediction method according to an embodiment. FIGS. 5 to 7 are diagrams for explaining the surrounding object movement prediction method according to an embodiment.

Referring to FIG. 4, in order to predict a movement path of a surrounding object, a representative velocity and an occupancy probability for each grid cell of the DOGM are calculated and predicted (S110). A method of calculating the representative velocity and occupancy probability of the grid cell will be described with reference to FIG. 5. Referring to FIG. 5, a plurality of types of particle data each having a position, a velocity, a direction, etc. may exist in each grid cell of the DOGM. The "particle data" may refer to one or more types of velocity information present in the grid cell. When the particle velocity is expressed as $\{v_x^i, v_y^i\}$, the representative velocity $\{v_x, v_y\}$ of that grid cell may be calculated by the following Equation 1:

$$v_x = \frac{1}{n}\sum_{i=1}^{n} v_x^i, \quad v_y = \frac{1}{n}\sum_{i=1}^{n} v_y^i \qquad \text{Equation 1}$$

where n is the number of types of particle data present in that grid cell.

When the representative velocity is calculated, the particles expressed according to the X-Y coordinate system, which is the coordinate system of the grid cell, are converted into a coordinate system X'-Y' of the representative velocity. The coordinate system X'-Y' of the representative velocity is a coordinate system in which the direction of the representative velocity is set as an X'-axis and the axis perpendicular to the X'-axis is set as a Y'-axis.

Then, a predicted standard deviation for each time is calculated using the representative velocity and particle data converted into the coordinate system X'-Y' of the representative velocity. The predicted standard deviation for each time may be calculated by the following Equation 2.

Equation 2

$$\sigma_{p,v_{x'}}(t) = \frac{\sigma_{v_{x'}}}{1 + \alpha(t-k)} \qquad (1)$$

$$\sigma_{p,v_{y'}}(t) = \frac{\sigma_{v_{y'}}}{1 + \alpha(t-k)} \qquad (2)$$

-continued
$\alpha$:STANDARD DEVIATION DAMPING RATIO $\sigma_{v_{x'}}$:$v_{x'}$ STANDARD DEVIATION $\sigma_{v_{y'}}$:$v_{y'}$ STANDARD DEVIATION $\sigma_{p,v_{x'}}$:PREDICTED $v_{x'}$ STANDARD DEVIATION AT K $\sigma_{p,v_{y'}}$:PREDICTED $v_{y'}$ STANDARD DEVIATION AT K Here, the standard deviation damping ratio α is gradually decreased as the time k passes, as illustrated in the graph of "standard deviation damping ratio over time" of FIG. 5. Accordingly, the predicted standard deviation calculated by (1) and (2) of Equation 2 increases as the prediction time k increases. Accordingly, the predicted standard deviation over time may be used to generate an occupied prediction area of a Gaussian distribution.

Referring to FIG. 4, when the occupancy probability of each grid cell is calculated, it is determined whether the occupancy probability is equal to or greater than a threshold value (S120).

When the occupancy probability is equal to or greater than the threshold value, an object movement prediction area for each time is generated (S130). FIG. 6 is a diagram for explaining the concept of creation of the object movement prediction area for each time. In FIG. 6, the higher the probability that a grid cell is occupied, the darker it is displayed. When the representative velocity of the grid cell at time k is V, the movement prediction area is predicted to move in the same direction as V. However, as time elapses as k+1, k+2, k+3, . . . , the range of the movement prediction area increases and the prediction probability allocated to that grid cell decreases.

After the object movement prediction area for each time is generated, an object occupancy prediction probability for each time in each prediction area is generated (S140). Referring to FIG. 7, the object estimated by the DOGM may include a plurality of grid cells. The object estimated at time k may be located in three grid cells, and each grid cell may have a representative velocity and a direction (V1k, V2k, and V3k). The object movement prediction area is an area including all prediction areas for each time calculated in each grid cell. That is, the area predicted at time k+1 is an area including all of a V1k+1 area based on V1k, a V2k+1 area based on V2k, and a V3k+1 area based on V3k. In the same way, the area predicted at time k+2 is an area including all of a V1k+2 area based on V1k, a V2k+2 area based on V2k, and a V3k+2 area based on V3k.

After the object occupancy prediction probability for each time in each prediction area is generated, it is determined whether the prediction probability of each grid cell is equal to or greater than a threshold value (S150). If the probability is less than the threshold value, that prediction area is removed (S170).

If the probability is equal to or greater than the threshold value, that area is maintained as the object movement prediction area (S160).

Through the above process, a collision area may be predicted by comparing the set object movement prediction area for each time with the ego-vehicle path.

Figure 8:
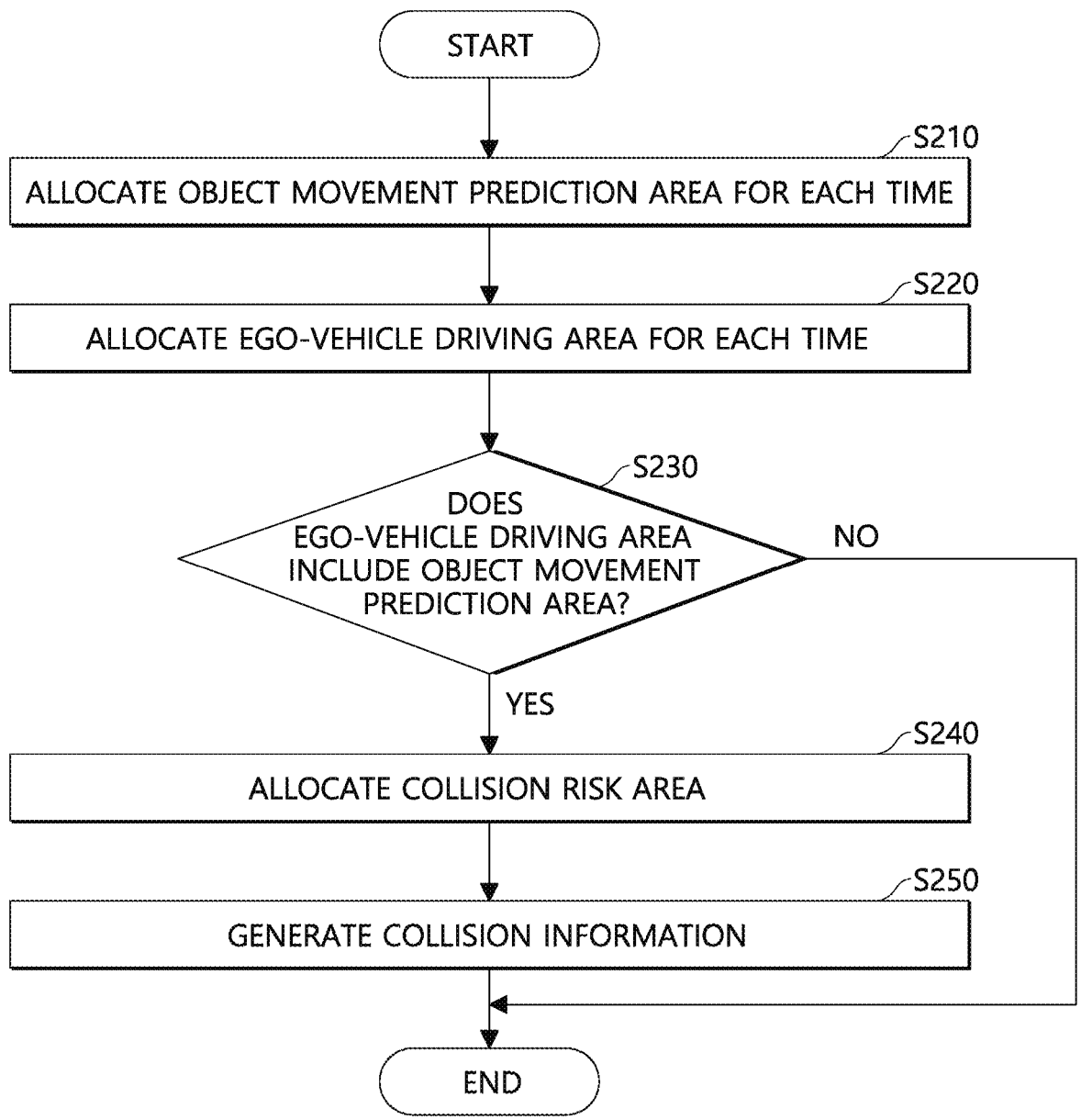
FIG. 8 is a flowchart illustrating a collision area prediction method with the collision avoidance control method according to an embodiment.
Figure 9:
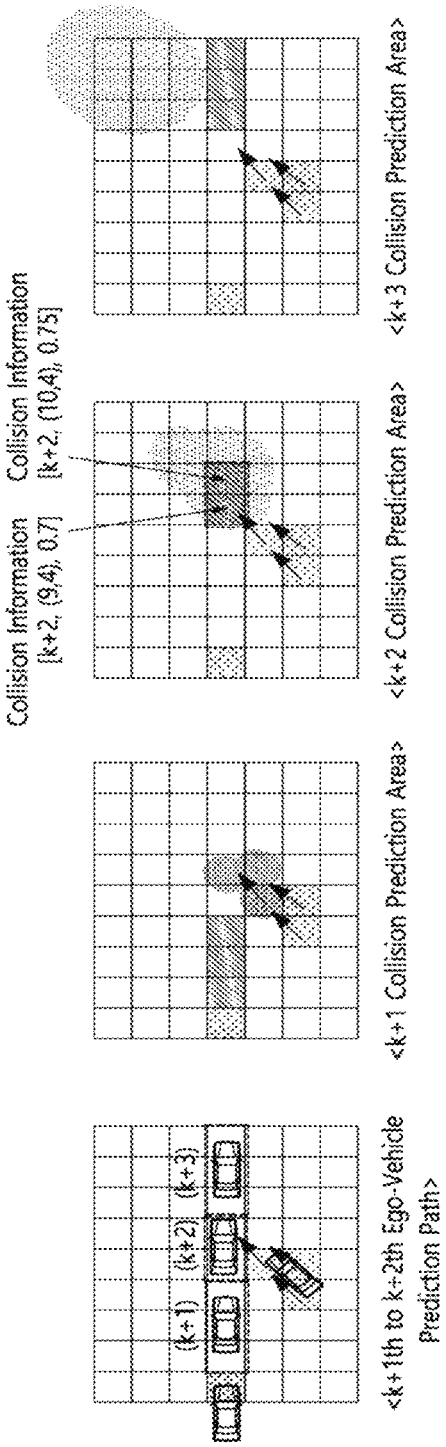
FIG. 9 is a diagram for explaining the collision area prediction method according to an embodiment.

FIG. 8 is a flowchart illustrating a collision area prediction method according to an embodiment. FIG. 9 is a diagram for explaining the collision area prediction method according to an embodiment.

Referring to FIG. 8, an object movement prediction area for each time is allocated on the grid map (S210), and an ego-vehicle driving area for each time is allocated (S220). Referring to FIG. 9, when the current time is k, the ego-vehicle driving area and the object movement prediction area at each of times k+1, k+2, and k+3 may be allocated on the grid map.

It is determined whether the ego-vehicle driving area includes the object movement prediction area (S230). Referring to FIG. 9, at time k+1, the ego-vehicle driving area does not overlap the object movement prediction area. That is, there is no collision risk area at time k+1.

When the ego-vehicle driving area includes the object movement prediction area, an area where the two areas overlap may be allocated as a collision risk area (S240). Referring to FIG. 9, at times k+2 and k+3, the ego-vehicle driving area overlaps the object movement prediction area. Since the ego-vehicle and the object are located at the same position at the same time, the ego-vehicle driving area at each of times k+2 and k+3 may be determined as a collision risk area.

When the collision risk area is allocated, collision information is generated (S250). The collision information may include a collision prediction time, a collision risk grid cell position, and a collision probability.

Figure 10:
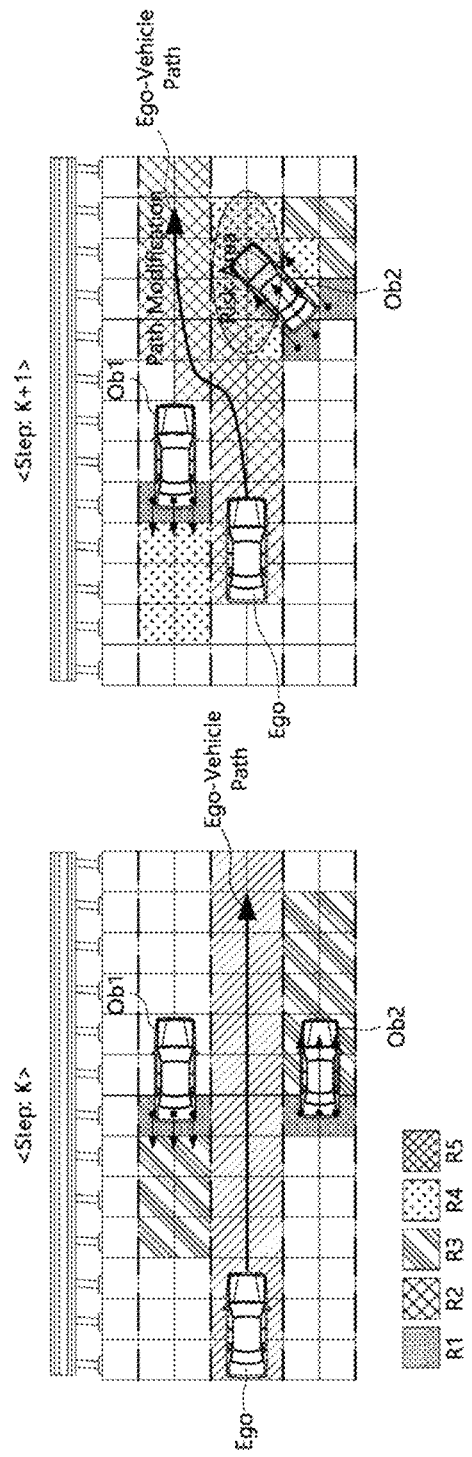
FIG. 10 is a diagram for explaining a collision avoidance control method according to a first embodiment.

FIG. 10 is a diagram for explaining a collision avoidance control method according to a first embodiment, specifically, a collision avoidance control method in a cut-in situation.

For collision avoidance, movement paths of surrounding objects Ob1 and Ob2 are predicted every preset time k, k+1, k+2, . . . , and compared with a travel path of an ego-vehicle Ego, thereby enabling a collision risk area to be determined.

The prediction path R3 of the first object Ob1 at time k (step: K) may be predicted according to the representative velocity and direction of the grid cell R1 occupied by the first object Ob1 at time k.

The prediction path R3 of the second object Ob2 at time k (step: K) may be predicted according to the representative velocity and direction of the grid cell R1 occupied by the second object Ob2 at time k.

The path R2 of the ego-vehicle Ego does not overlap the prediction path R3 of the first object Ob1, and it may therefore be determined that there is no risk of collision.

The prediction path R4 of the first object Ob1 at time k+1 (step: K+1) may be predicted according to the representative velocity and direction of the grid cell R1 occupied by the first object Ob1 at time k+1.

The prediction path R4 of the second object Ob2 at time k+1 (step: K+1) may be predicted according to the representative velocity and direction of the grid cell R1 occupied by the second object Ob2 at time k+1. The predicted path R4 of the second object Ob2 at time k+1 (step: K+1) has an area that overlaps the travel path R2 of the ego-vehicle Ego. An area where the predicted path R4 of the second object Ob2 overlaps the travel path R2 of the ego-vehicle Ego may be determined as a risk area.

Accordingly, it is possible to avoid collision by modifying the path of the ego-vehicle Ego to follow the path R5 for avoiding the risk area.

Figure 11:
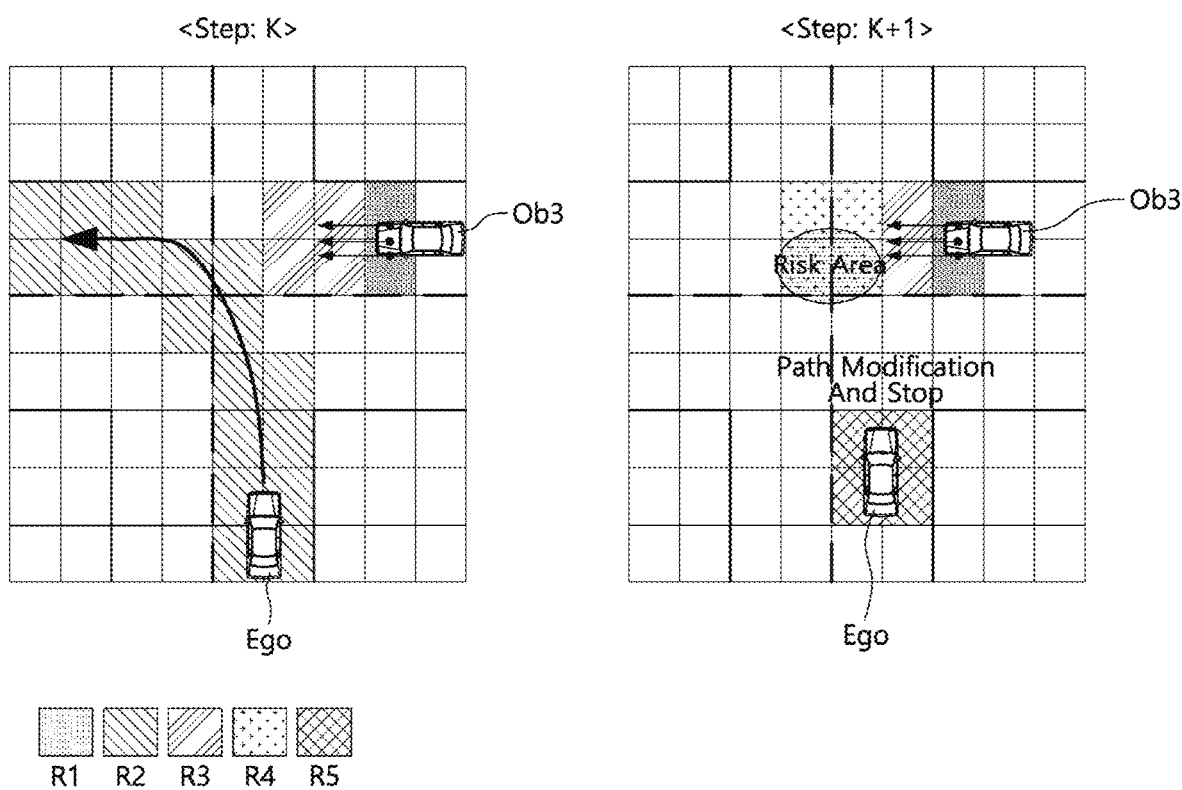
FIG. 11 is a diagram for explaining a collision avoidance control method according to a second embodiment.

FIG. 11 is a diagram for explaining a collision avoidance control method according to a second embodiment, specifically, a collision avoidance control method in an intersection driving situation.

For collision avoidance, a movement path of a surrounding object Ob3 is predicted every preset time k, k+1, k+2, . . . , and compared with a travel path of an ego-vehicle Ego, thereby enabling a collision risk area to be determined.

The prediction path R3 of the third object Ob3 at time k (step: K) may be predicted according to the representative velocity and direction of the grid cell R1 occupied by the third object Ob3 at time k.

The path R2 of the ego-vehicle Ego at time k (step: K) does not overlap the prediction path R3 of the third object Ob3, and it may therefore be determined that there is no risk of collision.

The prediction path R4 of the third object Ob3 at time k+1 (step: K+1) may be predicted according to the representative velocity and direction of the grid cell R1 occupied by the third object Ob3 at time k+1. The predicted path R4 of the third object Ob3 at time k+1 (step: K+1) has an area that overlaps the travel path R2 of the ego-vehicle Ego. An area where the predicted path R4 of the third object Ob3 overlaps the travel path R2 of the ego-vehicle Ego may be determined as a risk area.

Accordingly, it is possible to avoid collision by modifying the path of the ego-vehicle Ego to follow the path R5 for stopping at the current position.

As described above, embodiments of the present invention may predict the movement paths of the objects around the vehicle using the dynamic occupancy grid map that stores positions, velocities, and occupancy probabilities of the objects around the vehicle. In the DOCM, each object may be represented as a set of grid cells occupied by that object, and each of the grid cells may have a representative velocity vector and an occupancy probability. Accordingly, it is possible to predict the movement path of the object for each time by calculating the movement path and occupancy probability per unit time for each grid cell.

By comparing the predicted object movement path with the ego-vehicle travel path, the area where the two paths overlap at the same time may be set as the collision risk area. Therefore, it is possible to avoid collisions with objects by changing the ego-vehicle travel path to avoid the collision risk area.

As is apparent from the above description, the autonomous driving control system and the collision avoidance control method therewith according to embodiments of the present invention may predict movement paths of objects around a vehicle using the dynamic occupancy grid map that stores positions, velocities, and occupancy probabilities of the objects around the vehicle.

The autonomous driving control system and the collision avoidance control method therewith according to embodiments of the present invention may predict a collision area by comparing an area occupied by moving objects for each time, which is predicted using the dynamic occupancy grid map, with an ego-vehicle driving area, thereby generating a path to avoid a collision.

The embodiments of the present invention are not limited to the above-mentioned effects and other effects of embodiments of the present invention can be clearly understood by those skilled in the art to which the present invention pertains from the above description.

While the present invention has been described with respect to the embodiments illustrated in the drawings, it will be obvious to those skilled in the art that such embodiments are provided by way of example only. It will be understood by those skilled in the art that various modifications and applications may be made without departing from the spirit and scope of the invention as defined in the following claims. For example, each component specifically illustrated herein may be modified and implemented. Differences related to such modifications and applications should be construed as being included in the scope of the present invention as defined in the appended claims.

What is claimed is:

1. A collision avoidance control method with an autonomous driving control system, the method comprising:
generating a grid map by storing vehicle information comprising position and velocity vectors of a vehicle and object information comprising position and velocity vectors of an object sensed around the vehicle in a grid cell corresponding to an area occupied by the vehicle and the object; and
determining, as a collision risk area, an area where a grid cell occupied by the vehicle for each reference time set based on the vehicle information overlaps a grid cell occupied by the object for each reference time predicted based on the object information, to control avoidance of the collision risk area,
wherein generating the grid map comprises:
acquiring sensing information comprising at least one of position information and velocity information of the object by a plurality of sensors;
storing the sensing information acquired from each of the plurality of sensors in the respective grid cell;
calculating a representative velocity vector of each grid cell based on the sensing information stored in the grid cell, when a velocity of the sensing information stored in the grid cell is expressed as $\{v_x^i, v_y^i\}$ using X-Y coordinates of the grid cell, and a representative velocity $\{v_x, v_y\}$ of the grid cell is calculated by $$v_x = \frac{1}{n}\sum_{i=1}^{n} v_x^i, \quad v_y = \frac{1}{n}\sum_{i=1}^{n} v_y^i,$$

where n is a number of types of sensing information present in the grid cell;
calculating a predicted standard deviation for each time by substituting the representative velocity vector and the sensing information into a preset equation, wherein calculating the predicted standard deviation for each time comprises:
converting the velocity $\{v_x^i, v_y^i\}$ of the sensing information expressed as the X-Y coordinates of the grid cell into a coordinate system X'-Y' of the representative velocity; and
calculating the predicted standard deviation for each time by substituting the sensing information of which the coordinate system is converted into $$\sigma_{p,v_{x'}}(t) = \frac{\sigma_{v_{x'}}}{1 + \alpha(t-k)} \quad (1)$$

$$\sigma_{p,v_{y'}}(t) = \frac{\sigma_{v_{y'}}}{1 + \alpha(t-k)} \quad (2)$$

$\alpha$:STANDARD DEVIATION DAMPING RATIO $\sigma_{v_{x'}}$:$v_{x'}$ STANDARD DEVIATION $\sigma_{v_{y'}}$:$v_{y'}$ STANDARD DEVIATION $\sigma_{p,v_{x'}}$:PREDICTED $v_{x'}$ STANDARD DEVIATION AT $K$ $\sigma_{p,v_{y'}}$:PREDICTED $v_{y'}$ STANDARD DEVIATION AT $K$;

estimating an occupancy probability of the grid cell using the predicted standard deviation;
storing the estimated occupancy probability of the object as the object information in the grid cell; and
controlling the vehicle, using the autonomous driving control system and based at least in part on the object information, to avoid the collision risk area.

2. The method according to claim 1, wherein generating the grid map comprises:
estimating a position, and a velocity of each grid cell based on the vehicle information and the sensing information; and
storing the estimated position and velocity of the object as the object information in the grid cell.

3. The method according to claim 2, wherein in a prediction area, as time increases, a range of a movement prediction area of the object increases and a prediction probability allocated to each grid cell decreases.

4. The method according to claim 1, wherein estimating the occupancy probability of the grid cell using the predicted standard deviation comprises generating a prediction area of a Gaussian distribution using the predicted standard deviation for each time.

5. A non-transitory computer-readable storage medium recording a program comprising instructions for executing a collision avoidance control method with an autonomous driving control system, the program being configured to, when the instructions are executed by one or more processors of the autonomous driving control system:
generate a grid map by storing vehicle information comprising position and velocity vectors of a vehicle and object information comprising position and velocity vectors of an object sensed around the vehicle in a grid cell corresponding to an area occupied by the vehicle and the object; and
determine, as a collision risk area, an area where a grid cell occupied by the vehicle for each reference time set based on the vehicle information overlaps a grid cell occupied by the object for each reference time predicted based on the object information, to control avoidance of the collision risk area,
wherein, to generate the grid map, the program comprises further instructions to cause the one or more processors to:
acquire sensing information comprising at least one of position information and velocity information of the object by a plurality of sensors;
store the sensing information acquired from each of the plurality of sensors in the respective grid cell;
calculate a representative velocity vector of each grid cell based on the sensing information stored in the grid cell, when a velocity of the sensing information stored in the grid cell is expressed as $\{v_x^i, v_y^i\}$ using X-Y coordinates of the grid cell, and a representative velocity $\{v_x, v_y\}$ of the grid cell is calculated by $$v_x = \frac{1}{n}\sum_{i=1}^{n} v_x^i, \quad v_y = \frac{1}{n}\sum_{i=1}^{n} v_y^i,$$

where n is a number of types of sensing information present in the grid cell;
calculate a predicted standard deviation for each time by substituting the representative velocity vector and the sensing information into a preset equation by:
converting the velocity of the sensing information expressed as the X-Y coordinates of the grid cell into a coordinate system X'-Y' of the representative velocity; and calculating the predicted standard deviation for each time by substituting the sensing information of which the coordinate system is converted into $$\sigma_{p,v_{x'}}(t) = \frac{\sigma_{v_{x'}}}{1+\alpha(t-k)} \quad (1)$$

$$\sigma_{p,v_{y'}}(t) = \frac{\sigma_{v_{y'}}}{1+\alpha(t-k)} \quad (2)$$

$\alpha$:STANDARD DEVIATION DAMPING RATIO $\sigma_{v_{x'}}$:$v_{x'}$ STANDARD DEVIATION $\sigma_{v_{y'}}$:$v_{y'}$ STANDARD DEVIATION $\sigma_{p,v_{x'}}$:PREDICTED $v_{x'}$ STANDARD DEVIATION AT $K$ $\sigma_{p,v_{y'}}$:PREDICTED $v_{y'}$ STANDARD DEVIATION AT $K$;

estimate an occupancy probability of the grid cell using the predicted standard deviation;

store the estimated occupancy probability of the object as the object information in the grid cell; and control the vehicle, using the autonomous driving control system and based at least in part on the object information, to avoid the collision risk area.

6. An autonomous driving control system, comprising:
one or more processors;
a map creator executing on the one or more processors and configured to generate a grid map by storing vehicle information comprising position and velocity vectors of a vehicle and object information comprising position and velocity vectors of an object sensed around the vehicle in a grid cell corresponding to an area occupied by the vehicle and the object;
a risk area detector executing on the one or more processors and configured to determine, as a collision risk area, an area where a grid cell occupied by the vehicle for each reference time set based on the vehicle information overlaps a grid cell occupied by the object for each reference time predicted based on the object information; and
a driving controller executing on the one or more processors and configured to control to avoid the collision risk area,
wherein the map creator is further configured to:
acquire sensing information comprising at least one of position information and velocity information of the object by a plurality of sensors;
store the sensing information acquired from each of the plurality of sensors in the respective grid cell;
calculate a representative velocity vector of each grid cell based on the sensing information stored in the grid cell, when a velocity of the sensing information stored in the grid cell is expressed as $\{v_x^i, v_y^i\}$ using X-Y coordinates of the grid cell, and a representative velocity $\{v_x, v_y\}$ of the grid cell is calculated by $$v_x = \frac{1}{n}\sum_{i=1}^{n} v_x^i, \; v_y = \frac{1}{n}\sum_{i=1}^{n} v_y^i,$$

where n is a number of types of sensing information present in the grid cell;

calculate a predicted standard deviation for each time by substituting the representative velocity vector and the sensing information into a preset equation by:
converting the velocity of the sensing information expressed as the X-Y coordinates of the grid cell into a coordinate system X'-Y' of the representative velocity; and
calculating the predicted standard deviation for each time by substituting the sensing information of which the coordinate system is converted into $$\sigma_{p,v_{x'}}(t) = \frac{\sigma_{v_{x'}}}{1+\alpha(t-k)} \quad (1)$$

$$\sigma_{p,v_{y'}}(t) = \frac{\sigma_{v_{y'}}}{1+\alpha(t-k)} \quad (2)$$

$\alpha$:STANDARD DEVIATION DAMPING RATIO $\sigma_{v_{x'}}$:$v_{x'}$ STANDARD DEVIATION $\sigma_{v_{y'}}$:$v_{y'}$ STANDARD DEVIATION $\sigma_{p,v_{x'}}$:PREDICTED $v_{x'}$ STANDARD DEVIATION AT $K$ $\sigma_{p,v_{y'}}$:PREDICTED $v_{y'}$ STANDARD DEVIATION AT $K$;

estimate an occupancy probability of the grid cell using the predicted standard deviation;

store the estimated occupancy probability of the object as the object information in the grid cell; and control the vehicle, using the autonomous driving control system and based at least in part on the object information, to avoid the collision risk area.

7. The system according to claim 6, wherein the map creator is configured to:
estimate a position and a velocity of each grid cell based on the vehicle information and the sensing information; and
store the estimated position and velocity of the object as the object information in the grid cell.

8. The system according to claim 7, wherein in a prediction area, as time increases, a range of a movement prediction area of the object increases and a prediction probability allocated to each grid cell decreases.

9. The system according to claim 6, wherein an object path predictor executing on the one or more processors is configured to generate a prediction area of a Gaussian distribution using the predicted standard deviation for each time.

* * * * *

UNITED STATES PATENT AND TRADEMARK OFFICE
CERTIFICATE OF CORRECTION

PATENT NO. : 12,420,843 B2
APPLICATION NO. : 17/987286
DATED : September 23, 2025
INVENTOR(S) : Heo et al.

It is certified that error appears in the above-identified patent and that said Letters Patent is hereby corrected as shown below:

In the Claims

In Column 12, in Claim 5, Line 64, after "velocity" insert -- $\{v_x^i, v_y^i\}$ --.

In Column 14, in Claim 6, Line 11, after "velocity" insert -- $\{v_x^i, v_y^i\}$ --.

Page 1 of 1

Signed and Sealed this
Twenty-eighth Day of October, 2025

John A. Squires
*Director of the United States Patent and Trademark Office*